United States Patent [19]
Zink

[11] Patent Number: 4,757,538
[45] Date of Patent: Jul. 12, 1988

[54] SEPARATION OF L+R FROM L−R IN BTSC SYSTEM

[75] Inventor: Scott E. Zink, Portland, Oreg.

[73] Assignee: Tektronix, Inc., Beaverton, Oreg.

[21] Appl. No.: 882,753

[22] Filed: Jul. 7, 1986

[51] Int. Cl.[4] .............................................. H04H 5/00
[52] U.S. Cl. ...................................................... 381/7
[58] Field of Search ................................ 381/7, 2, 3, 4

[56] References Cited

U.S. PATENT DOCUMENTS

| | | | |
|---|---|---|---|
| 4,282,401 | 8/1981 | Takahashi | 381/4 |
| 4,497,063 | 1/1985 | Ishida et al. | 381/7 |
| 4,539,697 | 9/1985 | Ishida et al. | 381/7 |

Primary Examiner—Forester W. Isen
Attorney, Agent, or Firm—Francis I. Gray

[57] ABSTRACT

A stereo signal separation system for separating the L+R and L−R components of a BTSC stereo signal mixes the BTSC signal with a multiple of the pilot frequency. To recover the L+R component the mixer output is combined with the input BTSC signal, and to recover to L−R component the mixer output is combined with a second mixer output shifted ninety degrees. The combined output is low pass filtered to recover the desired component.

5 Claims, 3 Drawing Sheets

SEPARATION OF L+R FROM L−R IN BTSC SYSTEM

BACKGROUND OF THE INVENTION

The present invention relates to signal separation circuits, and more particularly to a circuit for separating the L+R and L−R components of stereo audio in the BTSC system.

The BTSC system defines a main audio L+R channel up to 15 kHz, a pilot signal at the horizontal sweep frequency of 15.734 kHz, and a double side band, suppressed carrier stereo subchannel symmetrically about a frequency which is twice the pilot signal frequency. To design lowpass filters for this system requires filter performance several orders of magnitude beyond performance adequate for an FM stereo system. The guardbands between the main channel, the pilot signal and the subchannel are much narrower, and a dbx noise reduction compressor is placed in the subchannel, increasing the potential for subchannel to main channel crosstalk. The guardbands between the main channel and the pilot signal and between the pilot signal and the subchannel are only 734 Hz each, with the separation between the main channel and the subchannel being 1.468 kHZ. Thus, a significant factor in channel separation is the subchannel to main channel crosstalk.

Subchannel to main channel crosstalk occurs when the lower sideband of the subchannel leaks into the main channel due to inadequate lowpass filtering of the subchannel audio. This crosstalk is nonlinear, i.e., it is highly offensive to the ear because it is not harmonically related to the main channel signals. Additionally when the signal levels are low but the program material contains substantial L−R content, the dbx noise reduction compressor can cause subchannel levels to be 20–30 dB higher than main channel levels. When this occurs the main channel has negligible ability to psychoacoustically mask the crosstalk. Further the greatest gain is likely to be produced at high frequencies—the very frequencies that appear at the edge of the lower sideband and which are most likely to cause audible crosstalk.

High performance filters which are adequate for the BTSC system are quite complex, one such having as many as 29 poles of filtering overall, are expensive and require great stability. If the filter is too abrupt at cutoff, the result is ringing coming out of the filter.

What is desired is a stable, simple circuit for separating the L+R and L−R components of the BTSC signal while still eliminating crosstalk between the main channel and the subchannel.

SUMMARY OF THE INVENTION

Accordingly the present invention provides a circuit for separating L+R and L−R components of a BTSC signal by mixing the components with a given multiple of the pilot signal frequency and then adding or subtracting the resultant signals. To recover the L+R component the BTSC signal is low pass filtered to obtain both components (L+R and L−R), the components are mixed with a signal four times the pilot signal frequency, and then subtracted from the unmixed, low pass filtered BTSC signal. To obtain the L−R component the BTSC signal is mixed with an unshifted subcarrier frequency and with a 90 degree phase shifted subcarrier frequency, the output of the shifted mixer being shifted an additional 90 degrees, and the outputs of the mixers then being either added or subtracted depending upon the direction of the additional phase shift.

The objects, advantages and other novel features of the present invention will be apparent from the following detailed description when read in conjunction with the appended claims and attached drawing.

DESCRIPTION OF THE PREFERRED EMBODIMENT

Figure 1:
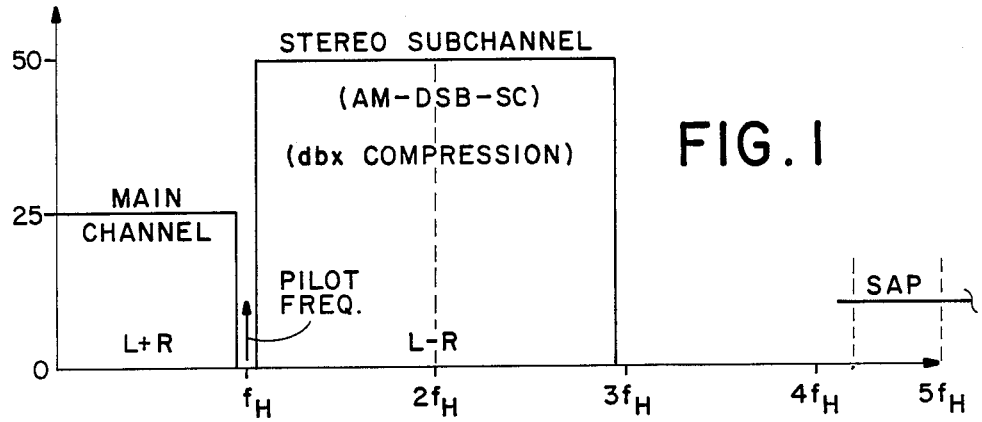
FIG. 1 is a frequency domain view of a portion of the BTSC stereo signal.

FIG. 1 illustrates a portion of the BTSC stereo signal having an L+R component; a double sideband, suppressed carrier L−R component; and a pilot signal. The respective signal deviations are 25, 50 and 5 kHZ. The second program channel (SAP) and the professional channel are omitted as not involved in the present invention. As is apparent from this frequency domain view any filtering to separate L+R from L−R is extremely difficult and would require a very precise, and hence very complex and expensive, filter.

Figure 2:
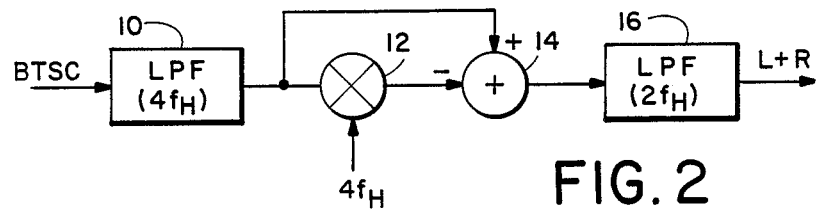
FIG. 2 is a block diagram view of a circuit for obtaining the L+R component of the BTSC stereo signal according to the present invention.
Figure 3:
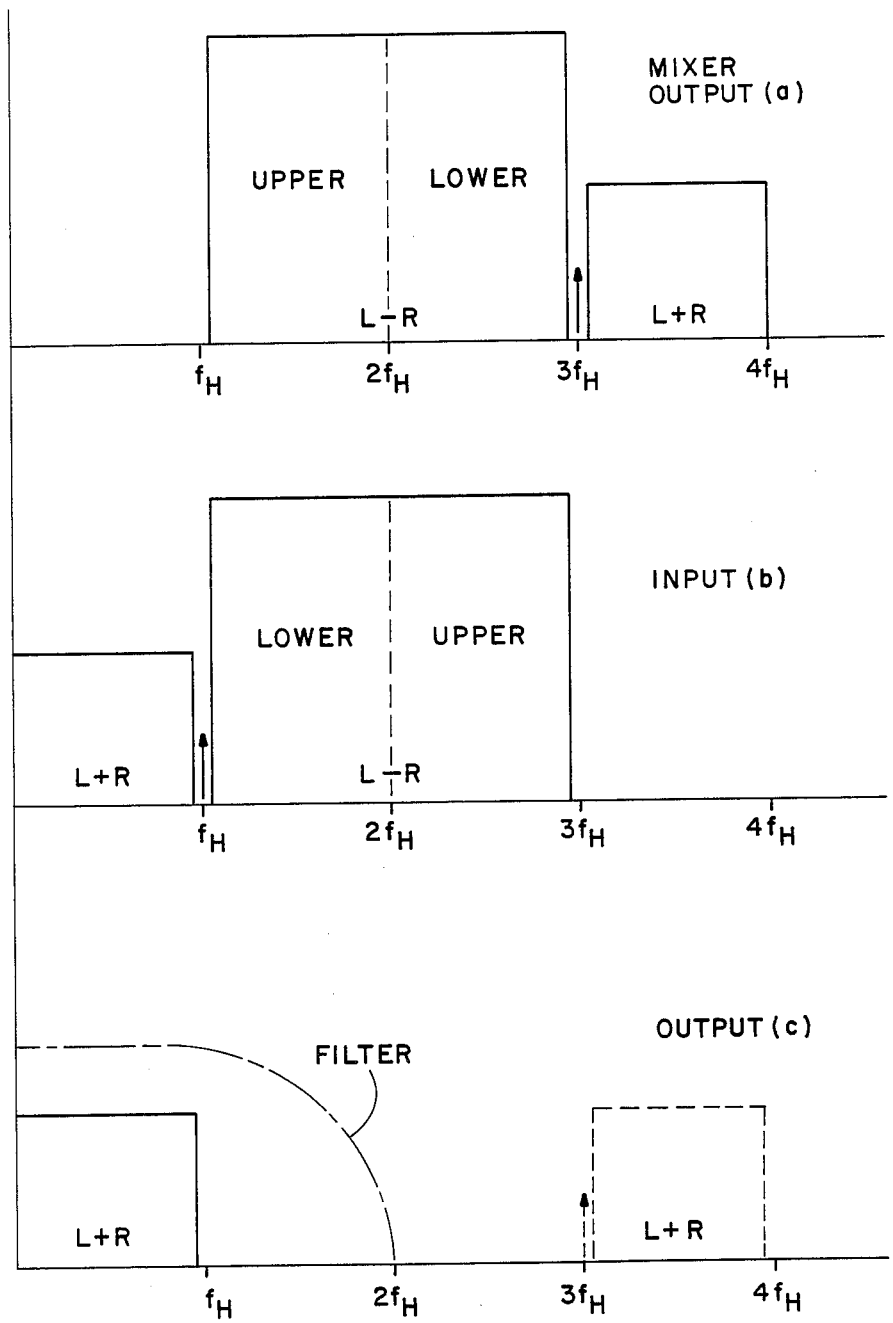
FIG. 3 is a frequency domain view illustrating the operation of the circuit of FIG. 2.

Referring now to FIG. 2 the BTSC stereo signal is input to a first low pass filter (LPF) 10 which has a bandwidth sufficient to encompass both the L+R and L−R components. The filtered output from the LPF 10 is input to a mixer 12 and a summer 14. The second input to the mixer 12 is a frequency $4f_H$ which is four times the pilot frequency $f_H$. Since the L−R component is symmetrical about the suppressed carrier frequency $2f_H$, i.e., the lower band is the mirror image of the upper band, as illustrated in FIG. 3 the difference frequencies shift the L+R component above the L−R component while leaving the L−R component essentially unchanged. The sum and difference outputs from the mixer 12 are input to the summer 14, the difference outputs being the only significant outputs. The summer 14 subtracts the output 3(a) from the mixer 12 from the input 3(b) to the mixer to produce an output 3(c) which contains only the original L+R component and a frequency shifted L+R component. The output from the summer 14 is input to a second low pass filter 16 to recover the original L+R component.

Figure 4:
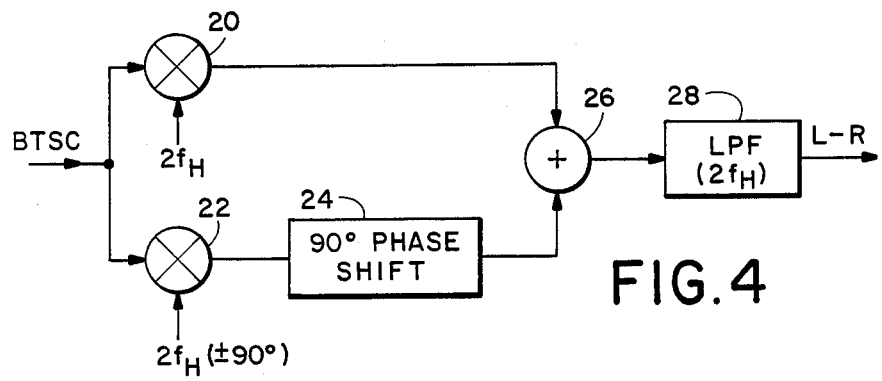
FIG. 4 is a block diagram view of a circuit for obtaining the L−R component of the BTSC stereo signal according to the present invention.
Figure 5:
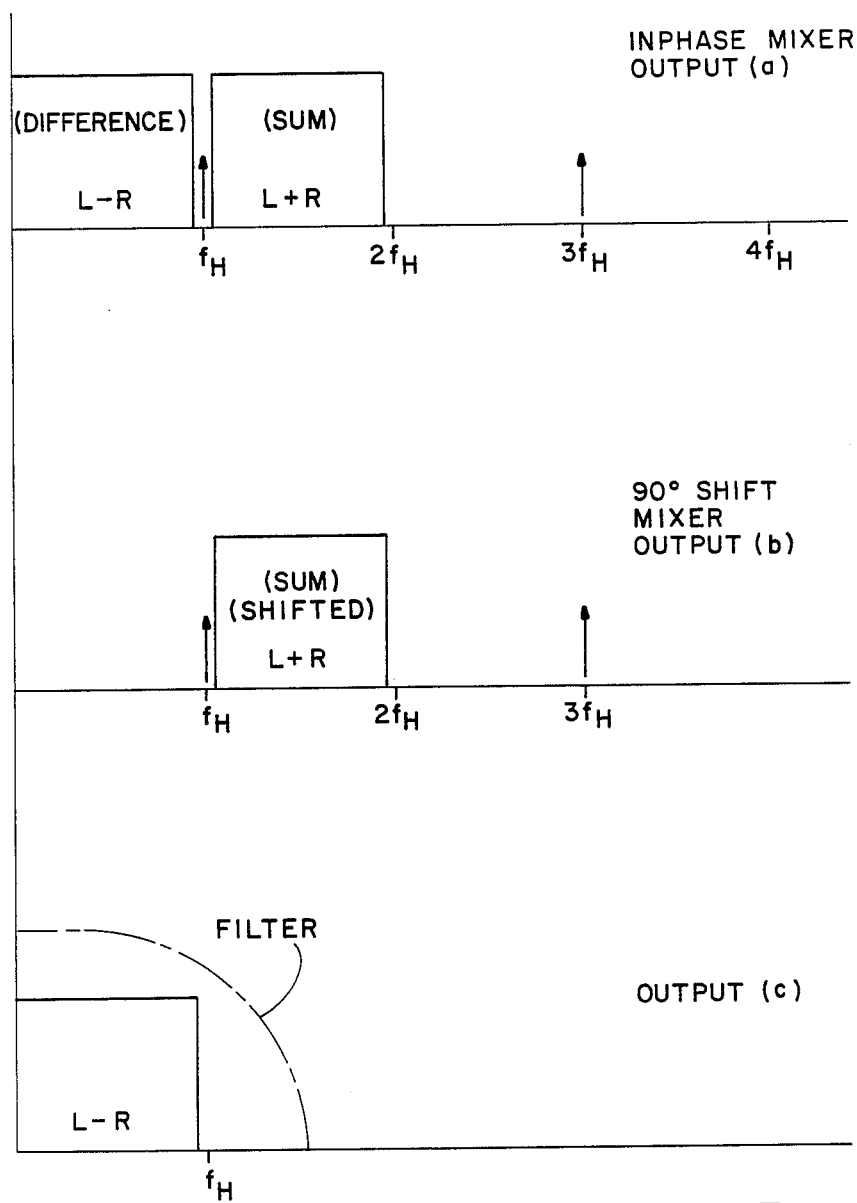
FIG. 5 is a frequency domain view illustrating the operation of the circuit of FIG. 4.

Alternatively the L−R component may be recovered as shown in FIG. 4. The BTSC stereo signal is input to two mixers 20 and 22. The second input to the mixers 20 and 22 is the subcarrier frequency $2f_H$ in phase quadrature, i.e., identical frequencies shifted 90 degrees from each other. As illustrated in FIG. 5 the output 5(a) of the inphase mixer 20 within the portion of the frequency domain of interest results in the L−R component being shifted down to below the pilot frequency and the L+R component being shifted above the pilot frequency. The output 5(b) of the phase shifted mixer 22 has only the L+R component shifted above the pilot frequency, the L−R component having been cancelled due to the phase shift and the symmetry of the upper and lower bands. The output of the phase shifted mixer 22 is passed through a 90 degree phase shifter 24 so that the L+R component is either in phase or 180 degrees out of phase with the L+R component from the in-phase mixer 20. The resulting outputs from the mixers 20 and 22 are input to a summer 26, which either adds or subtracts the two signals depending upon the direction of the 90 degree phase shift by the phase shifter 24. The resulting output 5(c) contains only the L−R component which can easily be obtained at this point by a low pass filter 28.

Thus the present invention provides a circuit for separating the L+R and L−R components of a BTSC stereo signal by mixing the BTSC signal with a multiple of the pilot signal and then summing the results, requiring only simple low pass filters in the circuit.

What is claimed is:

1. A stereo signal separation system comprising:
   means for mixing an input stereo signal having a lower frequency sum component, an upper frequency double sideband suppressed carrier difference component and a pilot frequency at a frequency between the sum and difference components with a mixer frequency which is a multiple of the pilot signal frequency to produce a first mixer output and with a phase quadrature component of the mixer frequency to produce a second mixer output;
   means for combining the first and second mixer outputs to eliminate the sum component; and
   means for filtering the output of the combining means to recover the difference component.

2. A stereo signal separation system as recited in claim 1 wherein the mixing means comprises:
   a first mixer to which is input the input stereo signal and the mixer frequency to produce the first mixer output, the mixer frequency being twice the pilot signal frequency; and
   a second mixer to which is input the input stereo signal and the phase quadrature component of the mixer frequency to produce the second mixer output.

3. A stereo separation system as recited in claim 2 wherein the combining means comprises a phase shifter to shift one of the first and second mixer outputs ninety degrees to produce a third mixer output.

4. A stereo signal separation system comprising:
   means for mixing an input stereo signal having a lower frequency sum component, an upper frequency double sideband suppressed carrier difference component and a pilot frequency at a frequency between the sum and difference components with a mixer frequency which is a multiple of the pilot signal frequency to produce a mixer output;
   means for combining the input stereo signal and the mixer output to eliminate the difference component; and
   means for filtering the output of the combining means to recover the sum component.

5. A stereo signal separation system as recited in claim 4 wherein the combining means comprises a summing circuit having as inputs the mixer output and the input stereo signal such that the difference component is eliminated and the sum component is recovered by the filtering means, the mixer frequency being four times the pilot signal frequency.

* * * * *